US006756764B2

United States Patent
Smith et al.

(10) Patent No.: US 6,756,764 B2
(45) Date of Patent: Jun. 29, 2004

(54) PORTABLE JUMPER SYSTEM AND METHOD

(76) Inventors: John S. Smith, 2130 Euston Dr., Park City, UT (US) 84068; Ty N. MacAlpine, 11078 Kley Rd., Vandalia, OH (US) 45414

( * ) Notice: Subject to any disclaimer, the term of this patent is extended or adjusted under 35 U.S.C. 154(b) by 375 days.

(21) Appl. No.: 09/799,216

(22) Filed: Mar. 5, 2001

(65) Prior Publication Data

US 2002/0121877 A1 Sep. 5, 2002

(51) Int. Cl.$^7$ .................................................. H02J 7/00
(52) U.S. Cl. ..................................................... 320/105
(58) Field of Search ......................... 320/105; 307/150; 362/184; 439/503–505

(56) References Cited

U.S. PATENT DOCUMENTS

| | | | |
|---|---|---|---|
| 3,165,689 A | | 1/1965 | Hughes |
| 4,075,470 A | * | 2/1978 | Moore .......................... 362/287 |
| 4,258,305 A | * | 3/1981 | Anglin ......................... 320/105 |
| 4,392,661 A | | 7/1983 | Langenstein |
| D300,920 S | | 5/1989 | Gierke |
| D316,397 S | | 4/1991 | Herbert |
| D321,680 S | | 11/1991 | Blount et al. |
| D334,560 S | | 4/1993 | Wilson |
| 5,220,269 A | * | 6/1993 | Chen et al. .................. 320/112 |
| D364,602 S | | 11/1995 | Qualls et al. |
| D374,859 S | | 10/1996 | Guay et al. |
| 5,589,292 A | | 12/1996 | Rozon |
| 5,637,978 A | | 6/1997 | Kellett et al. |
| 5,681,668 A | | 10/1997 | Reed et al. |
| D393,446 S | | 4/1998 | Bellofatto et al. |
| D407,065 S | | 3/1999 | Chang |
| D413,098 S | | 8/1999 | Dayan |
| 5,955,866 A | | 9/1999 | Peng |
| 5,982,138 A | * | 11/1999 | Krieger ....................... 320/105 |
| 5,993,983 A | | 11/1999 | Rozon |
| D417,429 S | | 12/1999 | Brezovar et al. |
| 5,998,961 A | | 12/1999 | Brown |
| 6,002,235 A | | 12/1999 | Clore |
| D420,324 S | | 2/2000 | Wan |
| 6,186,634 B1 | * | 2/2001 | Pitts ............................. 362/84 |
| 6,206,541 B1 | * | 3/2001 | Landamia .................... 362/184 |
| 6,215,273 B1 | * | 4/2001 | Shy .............................. 320/105 |
| 6,222,342 B1 | | 4/2001 | Eggert et al. |

OTHER PUBLICATIONS www.prestone.com.jumpit/home.htm web site for Prestone Jump It copyright 2000 Honeywell.

* cited by examiner

*Primary Examiner*—Gregory J. Toatley, Jr.
(74) *Attorney, Agent, or Firm*—Jacox, Meckstroth & Jenkins

(57) ABSTRACT

This invention relates to portable jump starters and, more particularly, to a portable jump starter having improved features for illumination, communication and notification all in a single portable device.

111 Claims, 9 Drawing Sheets

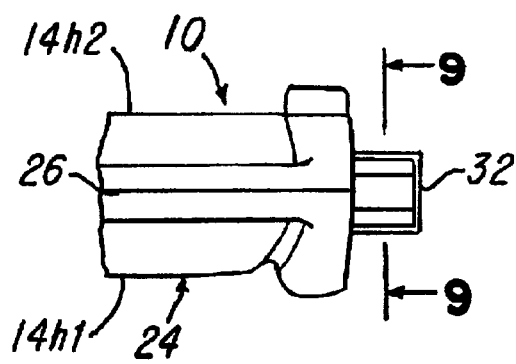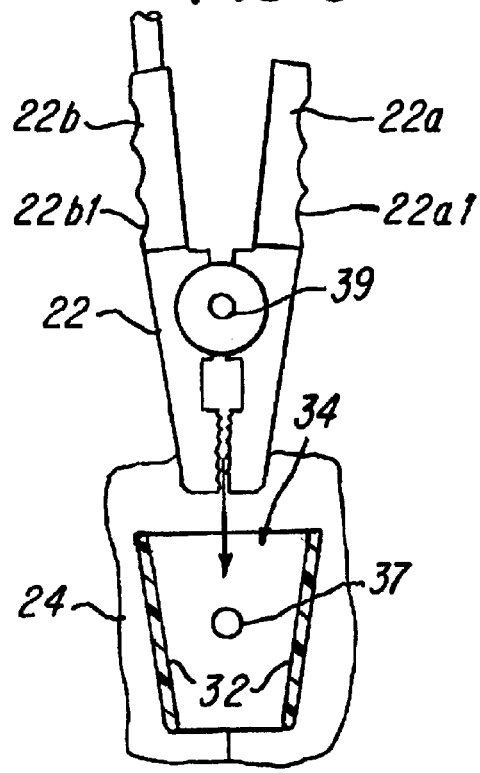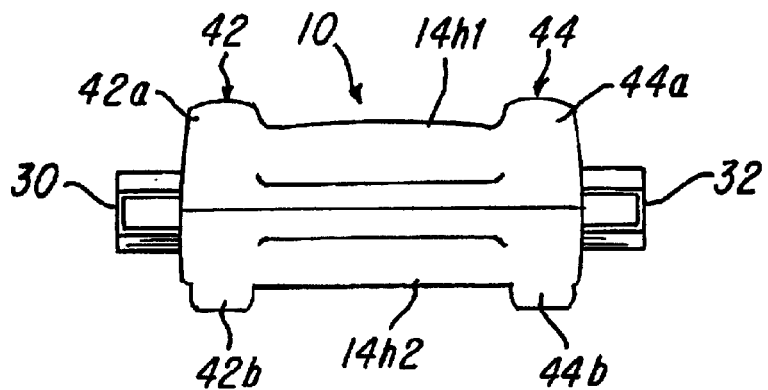

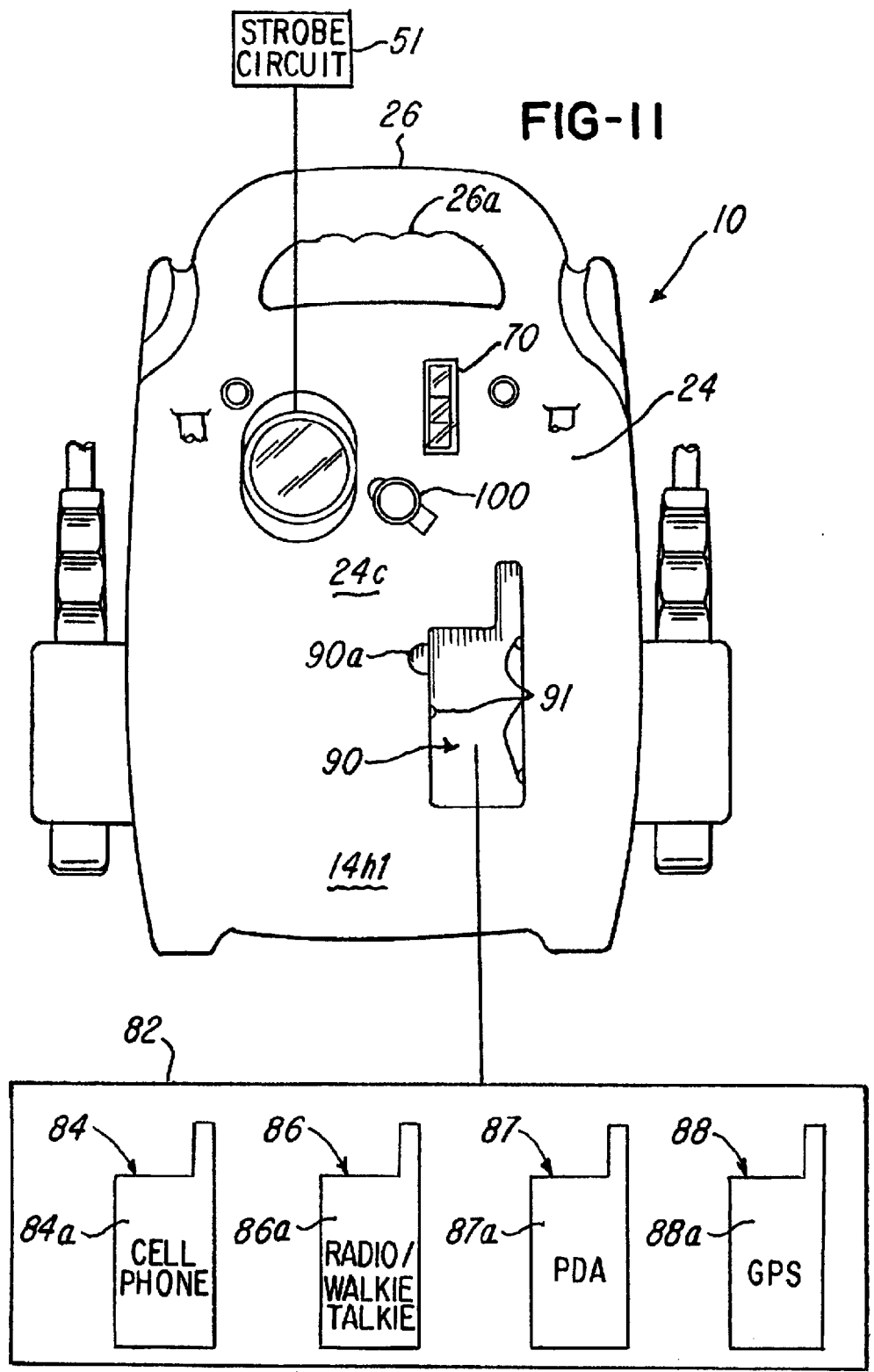

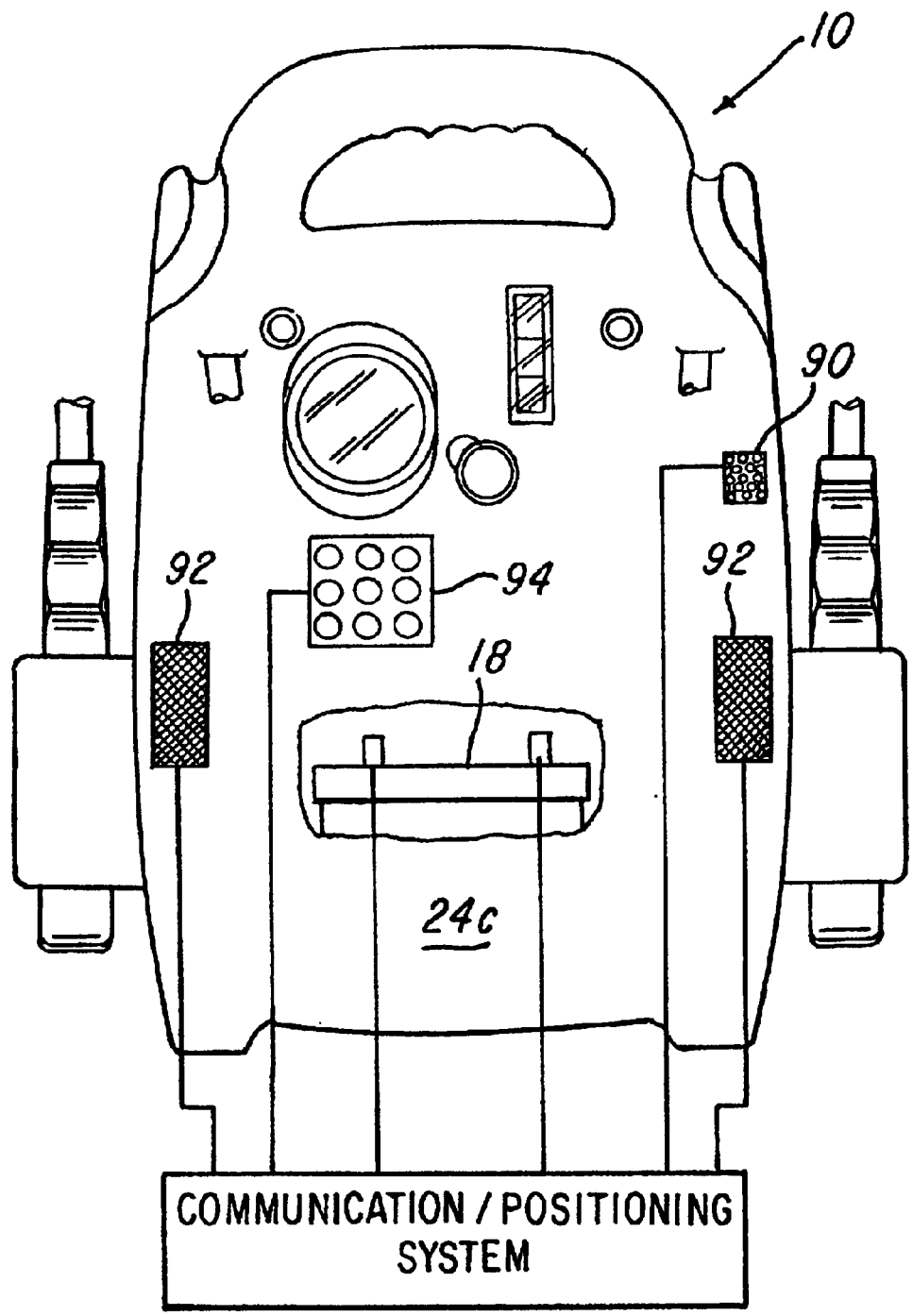

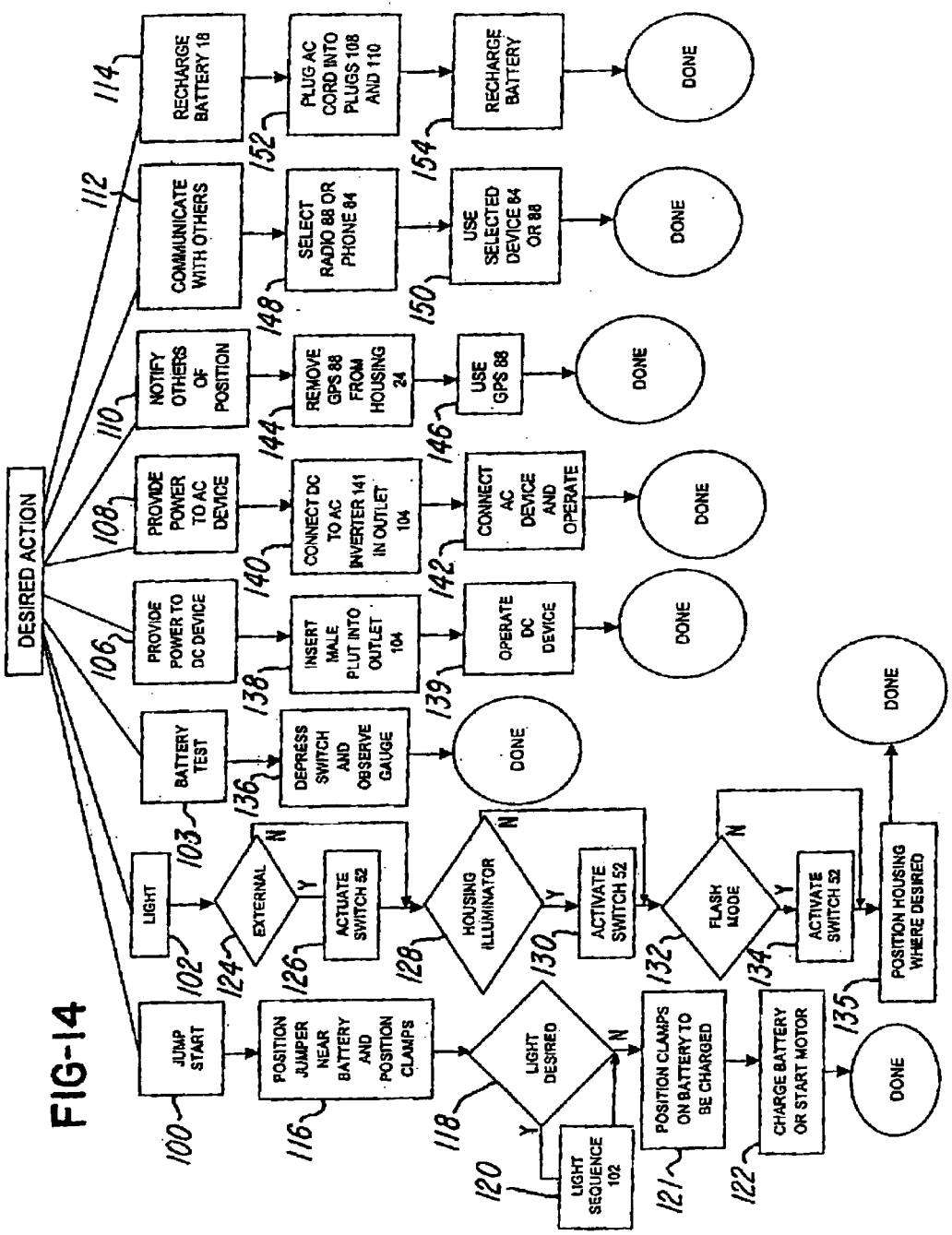

PORTABLE JUMPER SYSTEM AND METHOD

BACKGROUND OF THE INVENTION

1. Field of Invention

This invention relates to portable jump starters and, more particularly, to a portable jump starter having improved features for illumination, communication and notification all in a single portable device.

2. Description of the Related Art

Rechargeable portable battery chargers and portable DC power supplies have been around for many years. These devices typically provided a housing and jumper cables coupled to a battery situated in the housing. The portable chargers were used to jump start vehicles.

In one jump starter of the past, the starter had a voltage gauge and a DC outlet so that DC appliances could be plugged into the starter and operated using power from the battery stored in the charger.

The clamps on the cables were typically stored in a position such that the clamps were clamped onto posts mounted on the housing and any manner that required the operator to compress the clamps while simultaneously moving them downward toward the base of the housing. This was oftentimes troublesome depending on where the housing was situated and upon the physical strength of the user.

In some prior art chargers, a stationery light was also provided to provide illumination from the charger. Unfortunately, the stationery light of the chargers in the past was not adjustable, which sometimes meant that the charger had to be aimed at, for example, a battery to be charged. This was oftentimes difficult if a user was simultaneously trying to place a clamp on a terminal of the battery.

One type of battery charger is the model JUMP IT available from Prestone Products Corporation of Connecticut.

Another problem with the devices of the prior art was that they were limited in their capabilities. For example, if the device was taken during a trip, such as a vacation, hiking, or camping trip, the devices provided no means of communicating or notifying others, particularly in the event of an emergency.

Therefore, what is needed is a single system for providing not only the operations known in the past but also other features, such as adjustable illumination, notification (including communication and global positioning information) and emergency notification capability all in a single portable system.

SUMMARY OF THE INVENTION

It is therefore, a primary object of the invention to provide a single integrated system and method for providing a starter having multiple features, including the ability to adjustably direct a light source on the starter, optionally house one or more communication devices, such as cellular phones, radios, walkie-talkies, or a global positioning system.

Another object of the invention is to provide a system and method for providing an external illuminator, which may be adjusted in a vertical position such that the starter can be positioned and then the external illuminator can be adjusted.

Another object of the invention is to provide an internal illuminator for illuminating the housing and, if desired, providing a colored housing so that the housing may operate as a notification or warning device. It is another object of the invention to provide a strobing circuit for causing either or both of the internal and external illuminators to flash or strobe as desired.

It is another object of the invention to improve the storing of the clamps so that they may be stored in holsters in an upright and closed position so that they can be easily removed from the starter.

In one aspect, this invention comprises a portable jump starter comprising housing for receiving a battery a jumper for coupling said battery to a power-consuming device, the jumper comprising a plurality of jumper clamps, with each of the plurality of jumper clamps being movable from a closed position to an open position; and at least one holster for receiving the plurality of jumper clamps while the plurality of jumper clamps are in the closed position.

In still another aspect of this invention, this invention comprises a portable jump starter comprising a housing for receiving a battery, a jumper for coupling the battery to a power-consuming device, the jumper comprising a plurality of jumper clamps, with each of the plurality of jumper clamps being movable from a closed position to an open position, at least one holster for receiving the plurality of jumper clamps while the plurality of jumper clamps are in the closed position.

In still another aspect of this invention, this invention comprises a portable safety system comprising a housing for receiving a battery, a jumper for coupling to the battery, the jumper having a pair of clamps for coupling the battery to a power-consumer, at least one holster for receiving the pair of jumper clamps while the pair of jumper clamps are in a closed position, and a notifier for notifying persons of location, position, or emergency information.

In still another aspect of this invention, this invention comprises a portable jump starter comprising a housing for receiving a battery, a jumper for coupling the battery to a power-consuming device, the jumper comprising a plurality of jumper clamps, with each of the plurality of jumper clamps being movable from a closed position to an open position, at least one holster for receiving the plurality of jumper clamps while the plurality of jumper clamps are in the closed position, at least one adjustable illuminator, a switch for coupling the at least one adjustable illuminator to said battery in order to energize the at least one adjustable illuminator, and a notifier for notifying persons of location, position, or emergency information.

In still another aspect of the invention, this invention comprises a portable jump starter comprising a housing for receiving a battery, an inverter. for converting a DC power to an AC power, an AC power outlet, a DC power connection for coupling the battery to either a power source in order to recharge the battery or a DC power consumer, a jumper for coupling the battery to a power-consuming device, the jumper comprising a plurality of jumper clamps, with each of the plurality of jumper clamps being movable from a closed position to an open position, at least one holster for receiving the plurality of jumper clamps while the plurality of jumper clamps are in the closed position, at least one adjustable illuminator, a switch for coupling the at least one adjustable illuminator to the battery in order to energize the at least one adjustable illuminator, and a notifier for notifying persons of location, position, or emergency information.

In yet another aspect of the invention, this invention comprises a method for providing a multipurpose power supply comprising the steps off providing a portable jump starter comprising a housing for receiving a battery, the housing having a base, a jumper for coupling the battery to a power-consuming device, the jumper comprising a plurality of jumper clamps, with each of the plurality of jumper clamps being movable from a closed position to an open position, at least one holster for receiving the plurality of jumper clamps while the plurality of jumper clamps are in the closed position, and enabling the plurality of jumper clamps to be removed from the at least one holster away from the base without substantially compressing the plurality of jumper clamps.

These and other objects and advantages of the invention will be apparent from the following description, the accompanying drawings and the appended claims.

BRIEF DESCRIPTION OF THE DRAWINGS

FIG. 8 is a fragmentary plan view, showing details of the holster shown in FIG. 7;

FIG. 9 is a fragmentary sectional view illustrating further features of the holster shown in FIG. 7;

FIG. 10 is a bottom view of the starter shown in FIG. 1, illustrating various features of the base of the starter;

FIG. 11 is a partially schematic view of another embodiment of the invention showing an integrally molded recessed area for receiving a device, such as a cellular phone, walkie-talkie, global positioning system and/or radio;

FIG. 12 is a partially schematic view of another embodiment of the invention illustrating various communication and notification features integrally provided in the starter shown in FIG. 1;

FIG. 14 is a schematic view of various features and processes of the invention.

DETAILED DESCRIPTION OF THE PREFERRED EMBODIMENT

Figure 1:
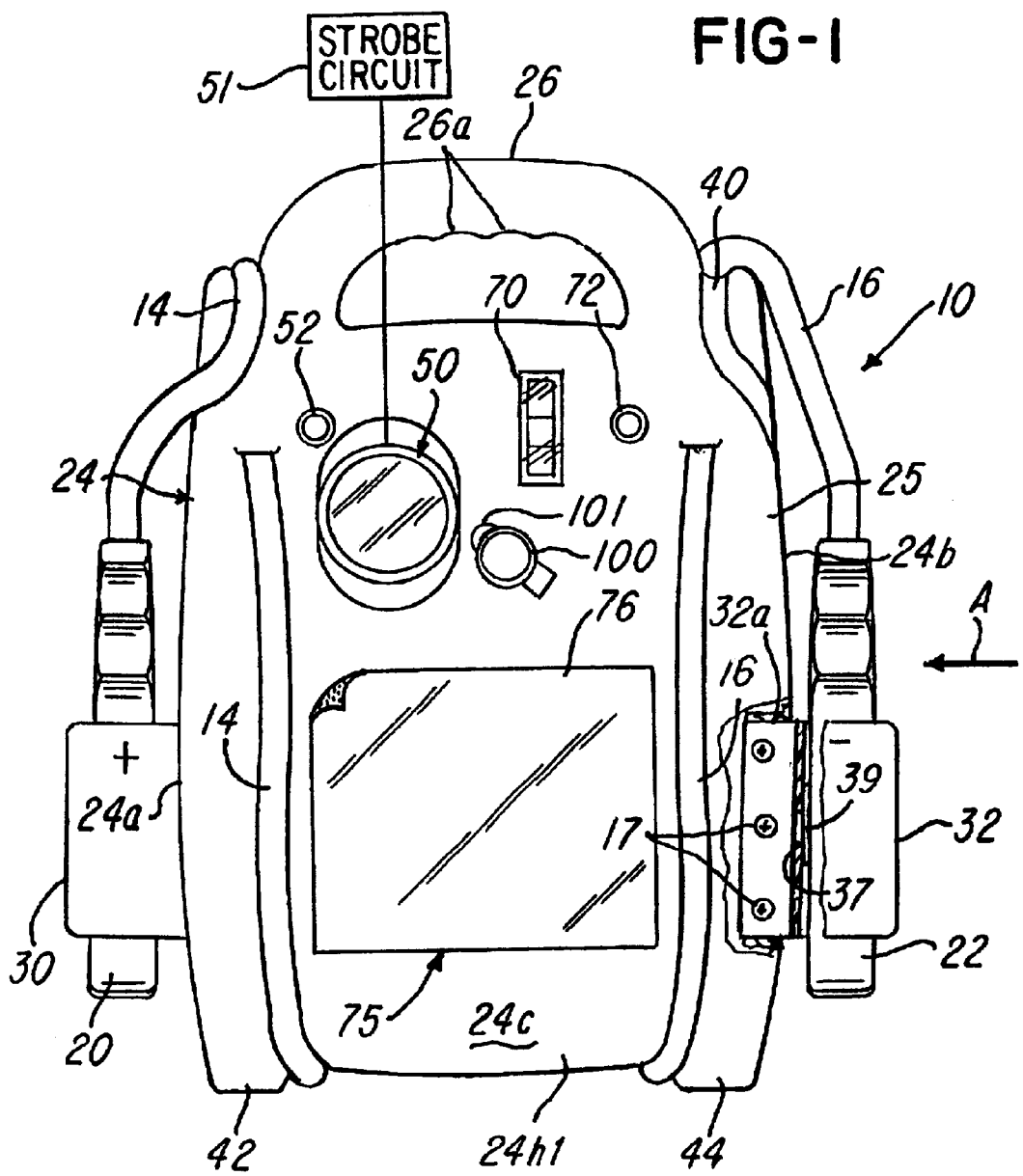
FIG. 1 illustrates a front view of a charger in accordance with one embodiment of the invention.
Figure 2:
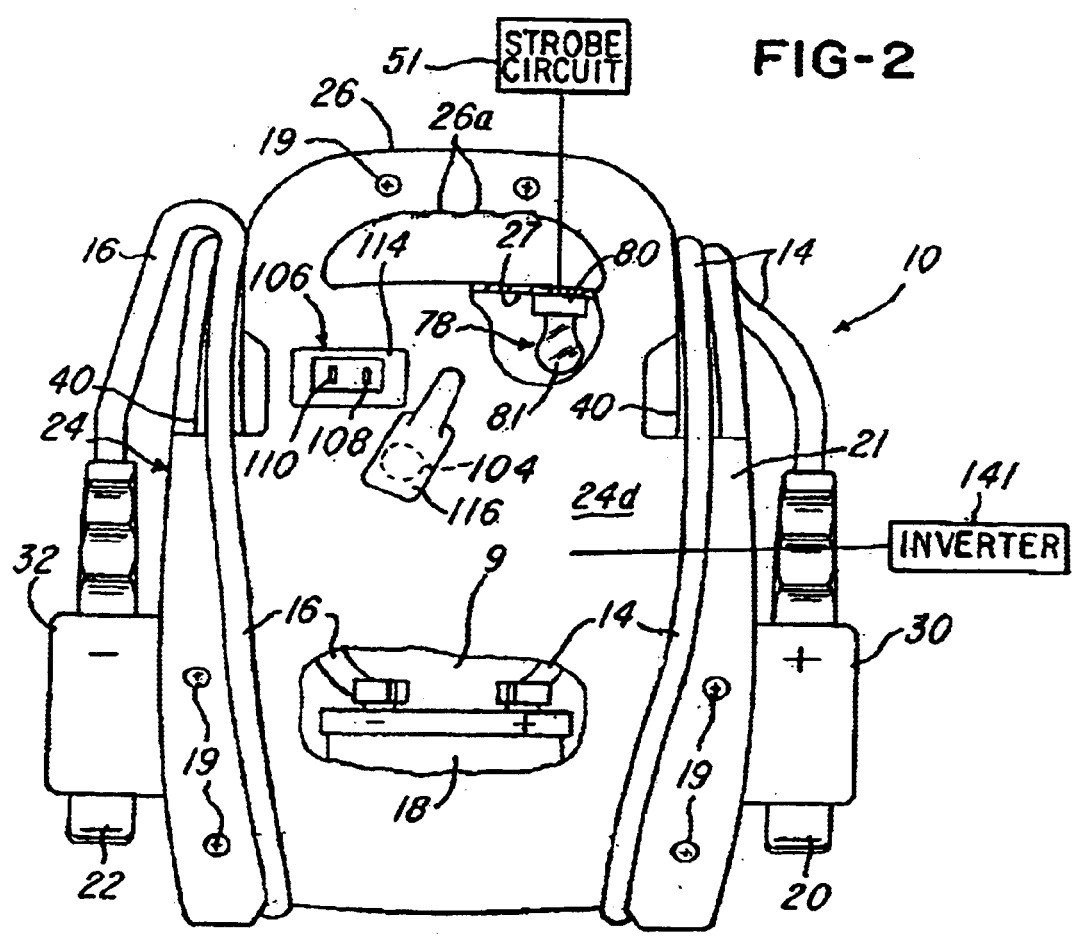
FIG. 2 illustrates a rear view of one embodiment of the invention.
Figure 3:
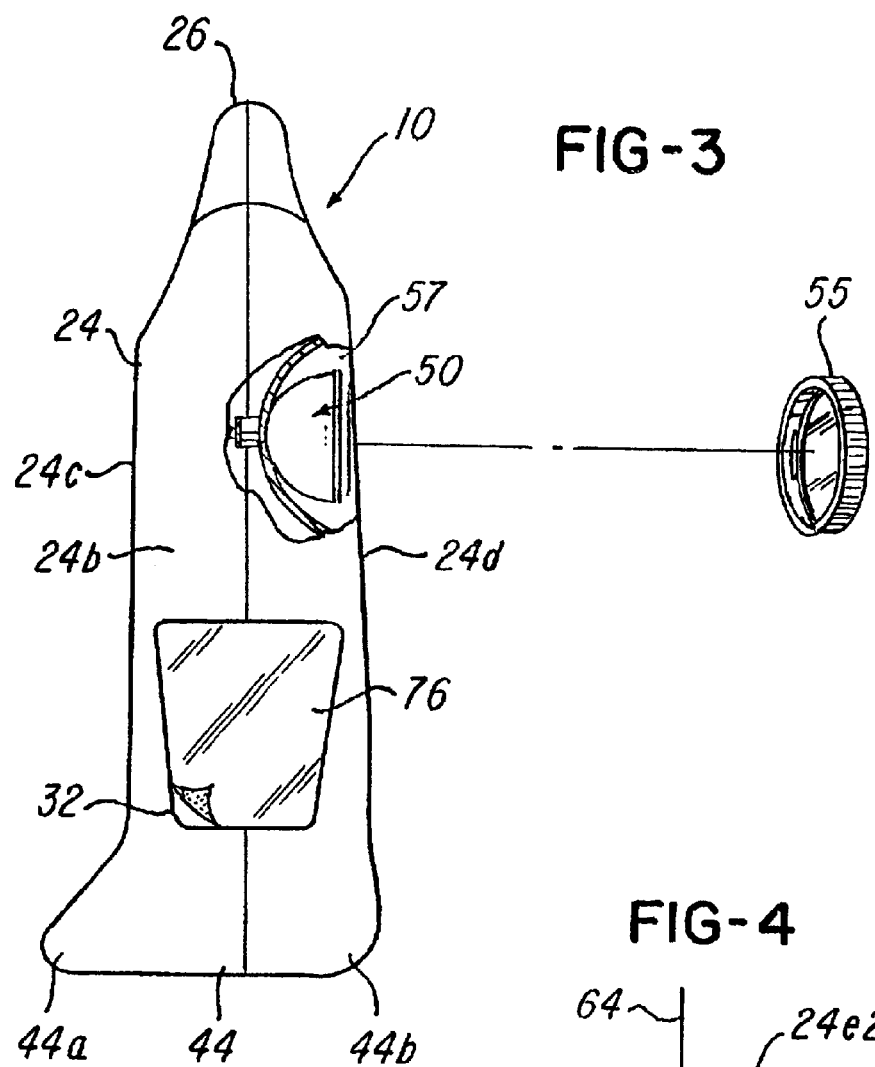
FIG. 3 illustrates a fragmentary view showing various features of the external illuminator with parts exploded.
Figure 4:
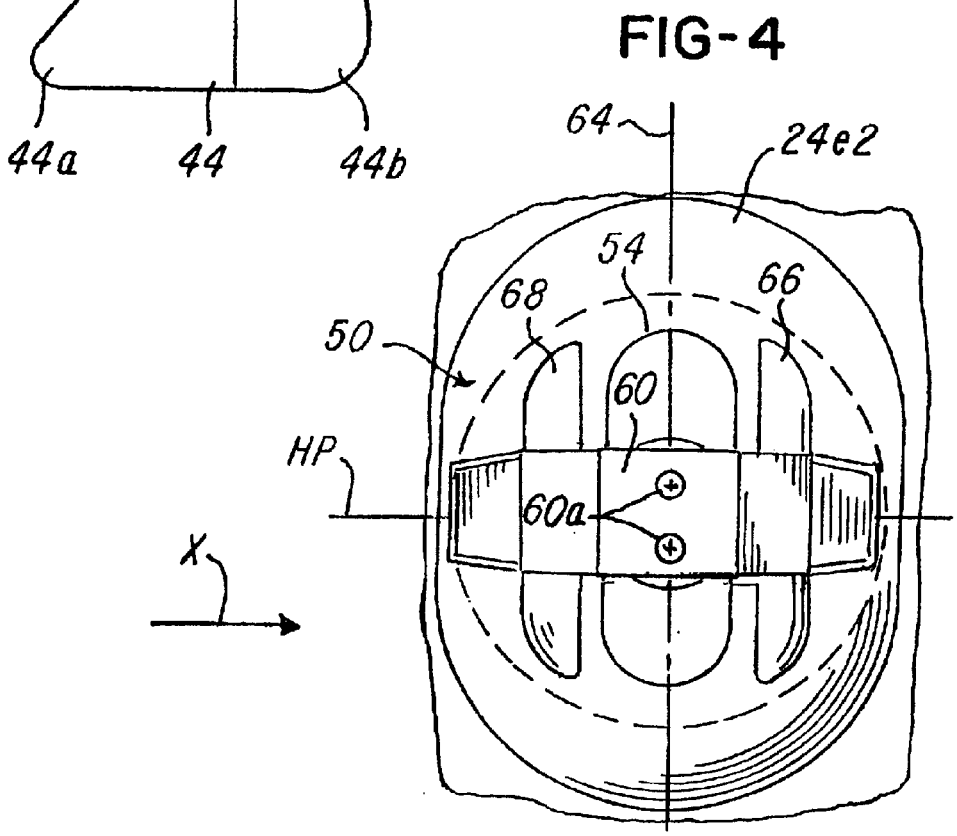
FIG. 4 is another fragmentary view showing other feature of the external illuminator.
Figure 5:
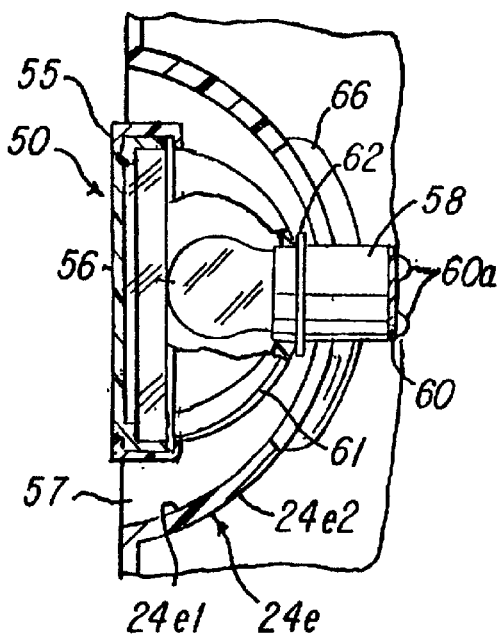
FIG. 5 is a fragmentary sectional view, taken in the direction of arrow X in FIG. 4.

Referring now to FIG. 1, a portable jump starter or starting system 10 is shown. The portable jump starter 10 comprises an integrally molded, two-piece housing 24 having a handle 26 with finger grips for facilitating carrying the portable jump starter 10. As illustrated in FIG. 3, the housing 24 comprises two halves, halve 24h1 and halve 24h2. After a battery 18 is situated between halves 24h1 and 24h2, the halves 24h1 and 24h2 are secured together with either detents (not shown) or screws 19 (FIG. 2).

The portable jump starter 10 comprises a first jumper cable 14 and a second jumper cable 16 having a first jumper clamp 20 and a second jumper clamp 22, respectively. During use, the jumper clamps 20 and 22 are coupled to a power-consuming device (not shown), such as a "dead" battery or other electronic device.

The housing 24 has at least one holster comprising a first holster 30 and a second holster 32 for receiving the first clamp 20 and the second clamp 22, respectively.

Figure 7:
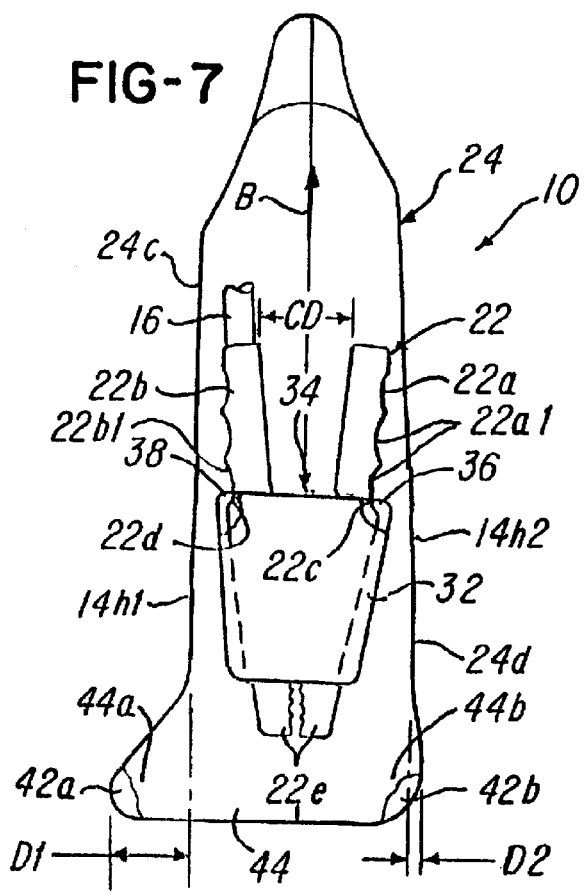
FIG. 7 is a view, taken in the direction of arrow A in FIG. 1, illustrating a holster for receiving and storing a clamp in an upright position.

As best illustrated in FIGS. 7–9, the holsters 30 and 32 are either integrally molded into housing 24 or separately molded and then fastened to a first side 24a and a second side 24b, respectively, of housing 24. For ease of illustration, the holsters 30 and 32 will be described relative to holster 32, but it should be understood that holster 30 comprises the same features. In one embodiment of the invention, the holsters 30 and 32 are separately molded with a receiving area 37, which receives detent 39 (FIG. 1) on clamp 22, thereby retaining the clamp 22 in a stored position. Alternatively, and as shown in FIG. 7, the holster 32 could be molded with one or more detents 36 or 38 that are received in finger recess areas 22a1 and 22b1. The holster 32 has a flange 32a (FIG. 1) that is secured to one of the halves 14h1 and 14h2 with screws 17. Screws 19 secure and retain the holster 32 in place.

As illustrated in FIG. 7, holster 32 provides a receiving area 34 for receiving and storing clamp 22 such that grips 22a and 22b of clamp 22 are situated adjacent housing 24 and in a vertical and upright manner. In this regard, the holster 32 comprises a plurality of detents, 36 and 38 that cooperate with the grips 22a and 22b, respectively, to secure and retain the clamp 22 in the stored position, as illustrated in FIG. 7. Notice that each grip 22a and 22b comprises a finger recess area 22a1 and 22b1, respectively, which in the second embodiment receives the detents 36 and 38 to facilitate retaining the clamp 22 in the stored position. When it is desired to remove the clamp 22 from the holster 32, for example, a user simply pulls the clamp 22 in the direction of arrow B in FIG. 7.

Although the embodiment being described herein comprises a plurality of holsters 30 and 32 situated on sides 24a and 24b, respectively, it should be appreciated that more or fewer holsters may be provided as needed. For example, the housing 24 may be provided (not shown) with a single holster (not shown) for receiving the clamps 20 and 22. Thus, a unique feature of the invention is that the housing 24 comprises at least one holster for storing the clamps 20 and 22 in an upright position (as illustrated in FIG. 2) so that they can be easily stored and removed from housing 24 during use.

Advantageously, this holster 32 and clamp 22 arrangement facilitates storing and retaining the clamps so that the grips 22a and 22b, for example, are in an upright manner (as viewed in FIGS. 1, 2, and 7) so that they can be easily stored and removed from the holster 32.

As best illustrated in FIGS. 1 and 2, the housing 24 may comprise a plurality of inmolded cable channels, such as channel 40 in FIG. 1, for receiving and storing cable 16 when the clamps 20 and 22 are not being used. Although not shown, the channels may comprise a plurality of detents or other means (not shown) for facilitating retaining the cables 14 and 16 in the stored position.

As best illustrated in FIGS. 7 and 10, notice that the housing 24 is inmolded to define at least one of a plurality of feet, such as feet 42 and 44. Notice in FIG. 10 that foot 42 comprises a front portion 42a and a heal or back portion 42b and foot 44 comprises a front portion 44a and a heal or back portion 44b. The heal portions 42b and 44b slightly bias the weight of the portable jump starter 10 toward the front portions 42a and 44a, respectively, in order to facilitate balancing the portable jump starter 10 so that it does not fall over during use. As best illustrated in FIG. 7. the front portions 42a and 44a of feet 42 and 44, respectively, extend beyond a front panel or side 24c a distance D1 that further facilitates stabilizing the portable jump starter 10 during use. Likewise, the heal or rear portions 42b and 44b extend beyond the rear panel 24d a distance D2 which also facilitates stabilizing the portable jump starter 10.

As best illustrated in FIGS. 3–6, the portable jump starter 10 comprises at least one adjustable external illuminator 50 coupled to a switch 52. The external illuminator 50 is mounted in a recessed area 57 defined by a concave wall 24e (FIGS. 5 and 6) in housing 24. The wall 24e comprises a slot 54 for receiving a light bulb 56 on a first side 24e1 and a socket 58 and a retaining spring 60 on a second side 24e2 of wall 24e in order to retain the bulb 56 in the recessed area 57. In this regard, the retaining spring 60 is wider than slot 54 and adjustably secures the bulb 56 in the recessed area 57. A plurality of friction stops or detents 66 and 68 may be integrally molded into a rear side 24e1 of wall 24e. In the embodiment being described, the socket 58 is press-fit between the detents 66 and 68. While the detents 66 and 68 engage the socket 58 and hold it in place, they do permit the socket 58 to pivot between them in order to permit the bulb 56 to be adjusted. The friction stops or detents 66 and 68 retain the bulb 56 in a fixed position after adjustment so that it does not move, for example, during use or transportation of the portable jump starter 10.

Figure 6:
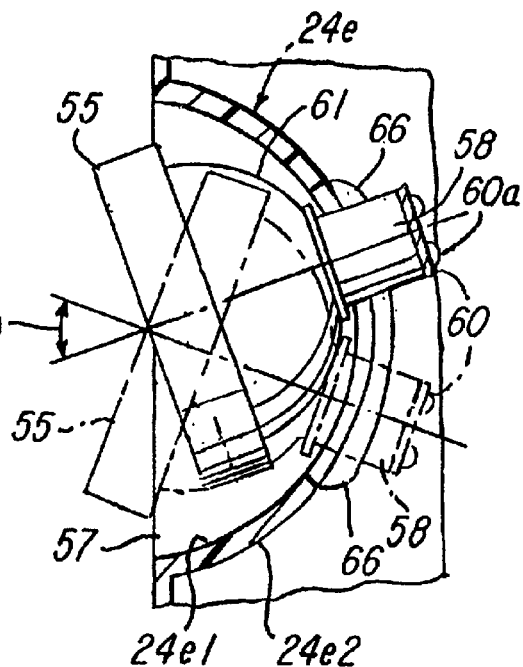
FIG. 6 is a fragmentary sectional view of the external illuminator illustrating various adjustment positions of the external illuminator.

It should be appreciated that slot 54 in the wall 24e permits the bulb 56 to be manually adjusted in a vertical plane 64 (FIG. 4), so that the light illuminated from the bulb 56 can be directed by a user as desired. In the embodiment being described, the light can be adjusted in a vertical plane 64 at an angle of about 40 degrees, as illustrated in FIG. 6. In the embodiment being described, the bulb 56 arrangement may be a General Electric 194 bulb or a Westinghouse 194 bulb.

Although not shown, it should be appreciated that the invention contemplates the use of an adjustable illuminator (not shown) that permits infinitely variable adjustment in either the vertical plane 64 (FIG. 3), horizontal plane HP (FIG. 4), or in any other plane as desired. It has been found that adjustment in the vertical plane 64 is most useful when a user uses the external illuminator 50 to illuminate, for example, an engine or trunk compartment of a vehicle or while the user examines an undercarriage of the vehicle. It is also contemplated that a removable illuminator (not shown) could be provided so that the external illuminator 50 may be temporarily removed from the housing 24 to provide a convenient flashlight in this regard, a user may hold the handle 26 to carry the portable jump starter 10 with one hand while holding and directing the removable external illuminator 50 (FIG. 3) with the other hand as desired. In the embodiment being described, the external illuminator 50 may be directly wired to the battery 18 or it may be rechargeable so that when it is mounted in a cradle (not shown) on housing 24, it becomes recharged over time by battery 18.

In this embodiment, the portable jump starter 10 comprises a strobe circuit 51 that is coupled to the switch 52 and illuminators 50 and 78 (described later) to cause one or both of the illuminators 50 and 78 to blink or flash at a desired rate, such as 60 flashes per minute. The user may actuate switch 52 into a flashing light or strobe mode during which the external illuminator 50 is caused to blink or flash on and off at a predetermined rate.

The portable jump starter 10 may further comprise a plurality of transparent and colored bezels 55 (FIG. 3) that may be detachably mounted over external illuminator 50. The bezels 55 may be, for example, orange, yellow, or red to provide a colored light or beacon or may be clear. As shown in FIG. 6, each bezel 55 is threaded allowing it to be detachably mounted to bulb housing 61.

The portable jump starter 10 further comprises a voltage gauge 70 having an associated test button 72 which is mounted into housing 24 and which provides means for testing the voltage level of the battery 18 (FIG. 2).

The portable jump starter 10 further comprises notification means or a notifier 75 (FIG. 1) for notifying and/or communicating various information, such as a location or position of the portable jump starter 10, emergency information, or other information. In one embodiment of the invention, the notification means or notifier 75 comprises a reflective label 76 situated on the front panel 24c of housing 24, as illustrated in FIG. 1. It should be appreciated that the reflective label 76 may be positioned on sides 24a, 24b, or even on the rear panel 24d as desired. It is also contemplated by the invention that the reflective label 76 could be integrally molded into the housing 24. While this notifying feature of the invention has been described by use of the reflective label 76 situated on housing 24, it should be appreciated that other graphics or signage could be provided on the outer surface 25 of housing 24 in order to achieve the notification function.

The notification means or notifier 75 may also comprise an internal illuminator 78 coupled to the battery 18 and switch 52. The internal illuminator 78 comprises a socket 80 that is mounted or inmolded onto an interior surface 27 of housing 24. A bulb 81 is received in socket 80 whenever it becomes coupled to switch 52 (FIG. 1). In this embodiment switch 52 is a multi-function switch actuable to energize external illuminator 50 and/or internal illuminator 78 either separately or in combination.

In the embodiment being described, the housing 24 is a plastic molded construction having a thickness of about 0.13 inch. When the switch 52 is actuated to energize internal illuminator 78, the housing 24 becomes illuminated. Also, the housing 24 is molded to comprise a predetermined color, such as safety orange, red, yellow, green or camouflage. Thus, when the internal illuminator 78 is energized the housing 24 becomes illuminated externally to glow a predetermined color. The internal illuminator 78 is also coupled to strobe circuit 51 so that the light from bulb 81 can be strobed upon actuation of switch 52.

Advantageously, the internal illuminator 78 provides means for illuminating the housing 24, which provides a convenient safety illumination that can be used in combination with or in replacement of, for example, traditional road flares. In operation, the user actuates the switch 52 and this causes battery 18 to energize bulb 81. The user then places the portable jump starter 10 at a desired position, such as behind a disabled vehicle (not shown) on a side of a road, in order to warn vehicle traffic of the disabled vehicle.

The user may actuate the switch 52 to simultaneously energize both the external illuminator 50 and the internal illuminator 78 in order to provide both external and/or internal illumination, respectively. As mentioned earlier, the colored covers may be mounted over the external illuminator 50 to provide colored light. Advantageously, when the user actuates switch 52 to cause external illuminator 50 to operate in a strobe mode, the colored light provides for example, a flashing warning light. When used with the internal illuminator 78, a powerful emergency notice is provided. The housing 24 may be provided with one or more windows (not shown) in order to permit the internal illuminator 78 to be used, for example, as a lantern or whenever a direct beam of light of the external illuminator 50 is not desired.

Referring now to FIG. 11, the notifying means or notifier 75 may further comprise a communication and positioning means or system 82. In the embodiment being described, the internal illuminator 78 comprises at least one communicating or location detection device (such as a cellular phone 84, a walkie-talkie or a two-way radio 86), personal digital assistant (PDA) 87, or a global positioning system (GPS) 88. The housing 24 comprises at least one receiving area 90 for receiving at least one of the devices 84–88. For ease of illustration, a single receiving area 90 is shown for receiving the phone 84, but it should be understood that a plurality of areas 90 could be provided for storing each of the devices 84–88. Also, the housing 24 could be provided without any receiving area 90 if desired.

At least one receiving area 90 comprises a plurality of detents 91 associated therewith for retaining, for example, the phone 84 in a stored position on the housing 24. The housing 24 may be molded to provide the receiving area 90 having a shape which complements the shape of the device 84–88 so that the front surfaces 84a, 86a, 87a, and 88a will be substantially co-planer with the front panel 24c of housing 24. This further permits the devices 84–88 to be operated while being stored in the housing 24. Alternatively, the devices 84, 86, 87, or 88 may be removed from the housing 24 using finger recess 90a.

Although not shown, the positioning means or system 82 comprising the devices 84–88 may be provided (i.e., rather than being separate, removable devices) as an integral component of the portable jump starter 10. In the embodiment, the portable jump starter 10 comprises a microphone 90, speakers 92, and an electronic pad or keyboard 94 that are either mounted on or inmolded into housing 24. The components 90–94 are coupled to communication circuitry that is energized by battery 18 to provide cellular phone capability, two-way radio/walkie-talkie capability, and/or global positioning system capability.

As illustrated in FIG. 1, the portable jump starter 10 also comprises a DC outlet plug 100 having a cap 101 which may be opened to permit access to a female DC receptacle for receiving a standard male DC receptacle for powering DC components, such as radios, hair dryers, battery rechargers, external lights, and the like.

Figure 13:
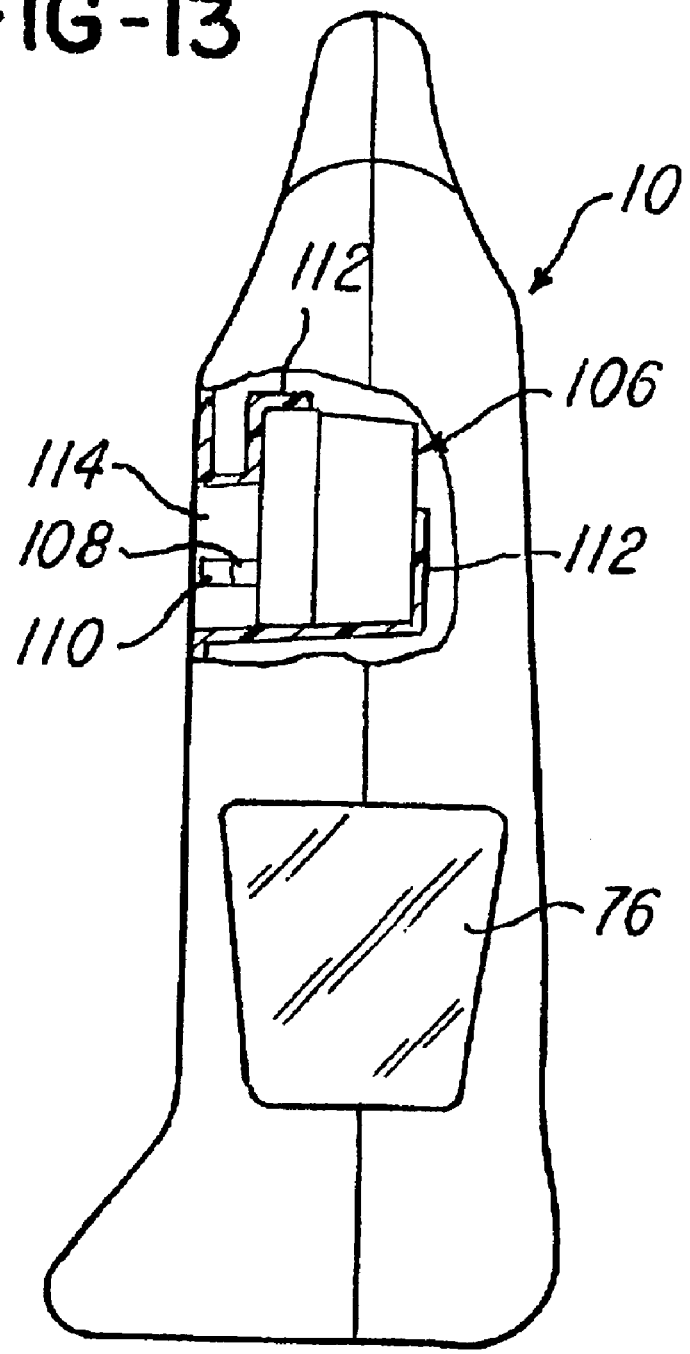
FIG. 13 is a fragmentary view, illustrating the structure and arrangement for storing a recharger for recharging a battery situated in the housing and further illustrating a reflective label situated on the housing.

The portable jump starter 10 further comprises recharging means or a charger 106 for recharging the battery 18 stored in the housing 24. The charger 106 comprises a plurality of male plug terminals 108 and 110 that may be received in, for example, a conventional extension cord (not shown) which may be plugged into a conventional AC outlet. As illustrated in FIGS. 2 and 13, the housing 24 may be molded to define a bracket 112 for receiving the charger 106 such that the male plugs 108 and 110 extend in a recessed area 114. A cap 116 is pivotally mounted to housing 24 and covers the area 114 when the male plugs 108 and 110 are not being used. The charger 106 is permanently coupled to the battery 18 and charges the battery 18 when it is coupled to a conventional AC outlet via, for example, a conventional extension cord (not shown). In the embodiment being described, the charger 106 is a conventional 12V 500 mA, TDNA model HD-1250-WH, available from Technical Devices of North America, Inc. of Dayton, Ohio.

Advantageously, this invention provides a power source and portable jump starter 10 whose most basic function is to provide a power source for many different applications, such as jump-starting a vehicle (such as a boat, automobile, truck, construction equipment, or other vehicle). The device has numerous features for notifying others of a position of the device, via the GPS device 88, or by providing communication means for contacting third parties using the cellular phone 84, walkie-talkie 86, PDA 87, or GPS 88, which, as mentioned earlier, may be integrally molded into the portable jump starter 10.

During a jump-start operation, a user may carry the portable jump starter 10 and situate it near, for example, a battery of a vehicle (not shown) after opening the hood of the vehicle. After adjusting external illuminator 50 (If needed), the jumper clamps 20 and 22 are removed from holsters 30 and 32, respectively, and situated on the terminals (not shown) of the vehicle battery so that the engine of the vehicle may be started. If necessary, switch 52 of portable jump starter 10 may be actuated by the user to energize external illuminator 50, thereby enabling the portable jump starter 10 to be used similar to a portable light source or flashlight.

As alluded to earlier, the user may also actuate switch 52 to cause the internal illuminator 78 (FIG. 2) to become energized, thereby illuminating the housing 24. Once illuminated, the portable jump starter 10 may be positioned like a road flare to provide a safety beacon as may be desired by the user. As also mentioned earlier herein, to further facilitate this safety feature, the housing 24 may be molded to be a predetermined color (such as safety orange, yellow, or red) so that when switch 52 is actuated to energize internal illuminator 78, the housing 24 becomes illuminated.

Referring now to FIG. 14, a schematic is provided to illustrate various features and processes of the invention that may be used alone or in combination. Initially, a user will select a desired action, for use of the portable jump starter 10. For example, the user may select one or more of the following operations: to provide jump start (block 100), to actuate the internal illuminator 78 and/or external illuminator (block 102). to test the battery 18 (block 103), to provide power to a DC device (block 106), power to an AC device (block 108), to notify others of a position (block 110), to communicate with others (block 112), or to recharge the battery 18 in the portable jump starter 10 (block 114). After selecting one or more modes of operation 100–114, various procedures are followed and these procedures will be explained in the order in which they appear in FIG. 14. However, it should be appreciated that the modes of operation 100–114 may each be selected alone or in combination and in any desired order.

Beginning with the jump-start procedure selected at block 100, the user positions the portable jump starter 10 near a battery or other power source to be provided with power from battery 18 (block 116). If it is dark or if the user requires light, the user may actuate switch 52 to energize an external illuminator 50 and/or internal illuminator 78 in accordance with the light mode sequence beginning at block 102). Thereafter or if the user does not wish to energize a light, the routine proceeds to block 121 where the user positions the clamp 22 on the power-consuming device, such as a battery to be charged, at block 121. At block 122, the battery provides enough power so that the user may attempt to start the engine of the vehicle.

The user actuates switch 52 to energize illuminators 50 or 78 in either a regular or flashing mode. One sequence for doing this is illustrated in FIG. 14, where the user begins by determining whether he desires to illuminate the external illuminator 50 (decision block 124) and if he does, then he would actuate switch 52 accordingly (block 126). If the user determines at decision block 124 that he does not wish to illuminate external light 50, but does wish to illuminate the housing 24 (decision block 128), then he would do so at block 130. If he determines that he does not wish to illuminate the housing 24 (decision block 128) or after doing so at block 130, the user may wish to cause one or both illuminators 50 or 78 to operate in the flashing or strobe mode (beginning at decision block 132) in which case the user actuates the switch 52 (block 134). If the decision at decision block 132 is negative after the user has actuated the switch 52 at block 134, then the user positions the housing 24 where desired.

If a battery test mode (block 103) is desired, the user depresses the test button 72 and observes the voltage gauge 70 in order to determine how much voltage is left in battery 18 (block 136).

If the user elects to power a DC device (block 106), then the user simply plugs a male connecter (not shown) of the DC device (not shown) into outlet 104 (block 138). Thereafter, the user may operate the DC device at block 139. If a user elects to power an alternating current (AC) device, the user connects a DC to AC inverter 141 (FIG. 2) in outlet 104 (block 140). Alternatively, as illustrated in FIG. 2, the portable jump starter 10 may comprise the inverter 141, for example, mounted in or on the housing 24. Thereafter, the user may connect the AC device to the inverter (block 142) and operates the AC device as desired.

If the user wishes to notify others of his position (block 110). then the user removes the GPS device 88 from housing 24 (block 144) and uses the device to determine his position (block 146). If the GPS device 88 is provided as an integral component of the portable jump starter 10, then the user simply uses the GPS device 88 as integrally provided in the portable jump starter 10 (without removing it from the housing 24).

If the user desires to communicate with others (block 112), then he selects the radio device 86 or phone device 84 (block 148) and uses the selected device 84 or 86 as desired.

Finally, if battery 18 needs to be recharged, then the user plugs an AC cord onto plugs 108 and 110 (block 152) and thereafter charges the battery 18 (block 154).

Advantageously, the portable jump starter 10 provides an improved combination of features and components. The system provides improved means for storing jumper clamps 20 and 22 in the holsters 30 and 32 that are either attached or integrally molded in housing 24. The system provides numerous safety features, such as the adjustable external illuminator 50 and internal illuminator 78, as well as the flashing mode sequence all of which can be actuated using the single switch 52. The notifier or notification means in the form of the reflective label 76 also provides a significant safety feature which; when used alone or in combination with the strobe or flashing light sequence, can provide a significant visual warning to, for example, approaching vehicle traffic. The portable jump starter 10 further provides the adjustable external illuminator 50 which can be adjustably positioned in a vertical plane 64 so that the user can adjust and direct the light from external illuminator 50. This has been found to be particularly useful when the portable jump starter 10 is situated, for example, near an engine compartment with the light from external illuminator 50 directed toward the battery to be jumped in order to make it easier for the user to position the jumper clamps 20 and 22 on the battery.

Moreover, the GPS 88 and communication system stored or mounted an portable jump starter 10 provide means for determining a user's position, as well as enabling a user to communicate with others. These features are believed to have significant advantages when the portable jump starter 10 is taken while traveling in a vehicle or on a boat. The portable jump starter 10 is also suited for camping or other recreational activity or even business activity, such as on a construction job or at home.

While the method herein described, and the form of apparatus for carrying this method into effect, constitute preferred embodiments of this invention, it is to be understood that the invention is not limited to this precise method and form of apparatus, and that changes may be made in either without departing from the scope of the invention, which is defined in the appended claims.

What is claimed is:

1. A portable jump starter comprising:

a housing for receiving a battery;

a jumper for coupling said battery to a power-consuming device; said jumper comprising a plurality of jumper clamps, with each of said plurality of jumper clamps being movable from a closed position to an open position; and at least one holster for receiving said plurality of jumper clamps while said plurality of jumper clamps are in said closed position.

2. The portable jump starter as recited in claim 1 wherein said at least one holster is integrally molded in said housing, said at least one holster defining a receiving area for receiving said plurality of jumper clamps while said plurality of jumper clamps are in said closed position.

3. The portable jump starter as recited in claim 1 wherein said at least one holster is detachably connected to said housing, said at least one holster defining a receiving area for receiving said plurality of jumper clamps while said plurality of jumper clamps are in said closed position.

4. The portable jump starter as recited in claim 1 wherein said at least one holster comprises at least one detent for securing said plurality of jumper clamps in a locked position when they are received in said at least one holster.

5. The portable jump starter as recited in claim 1 wherein said portable jump starter comprises:

a plurality of holsters for receiving said plurality of jumper clamps.

6. The portable jump starter as recited in claim 5 wherein said portable jump starter comprises a front panel, a rear panel, a first side panel and a second side panel, said plurality of holsters comprising a first holster and a second holster integrally molded in said first side panel and said second side panel, respectively.

7. The portable jump starter as recited in claim 5 wherein each of said plurality of jumper clamps comprises a grip, each of said plurality of holsters comprising at least one rib for engaging said grip in order to secure said plurality of jumper clamps in a locked position when they are received in said plurality of holsters, respectively.

8. The portable jump starter as recited in claim 5 wherein said portable jump starter comprises a base for supporting said portable jump starter, said plurality of holsters each defining an opening directed away from said base.

9. The portable jump starter as recited in claim 1 wherein said jumper comprises a single cable, said housing comprises a channel for receiving said single cable when said plurality of jumper clamps are stored in said at least one holster.

10. The portable jump starter as recited in claim 5 wherein said jumper comprises a plurality of cables, said housing comprises a plurality of channels for receiving said plurality of cables when said plurality of jumper clamps are received in said plurality of holsters.

11. The portable jump starter as recited in claim 1 wherein said housing comprises a stabilizer for stabilizing said housing.

12. The portable jump starter as recited in claim 11 wherein said housing comprises a base that is integrally molded to define at least one foot.

13. A portable jump starter comprising:
   a housing for receiving a battery;
   a jumper for coupling said battery to a power-consuming device; said jumper comprising a plurality of jumper clamps, with each of said plurality of jumper clamps being movable from a closed position to an open position; and
   at least one holster for receiving said plurality of jumper clamps while said plurality of jumper clamps are in said closed position.

14. The portable jump starter as recited in claim 13 wherein said at least one holster is integrally molded in said housing, said at least one holster defining a receiving area for receiving said plurality of jumper clamps while said plurality of jumper clamps are in said closed position.

15. The portable jump starter as recited in claim 13 wherein said at least one holster comprises at least one receiving area for receiving a detent on said clamp for securing at least one of said plurality of jumper clamps in a locked position when they are received in said at least one holster.

16. The portable jump starter as recited in claim 13 wherein said portable jump starter comprises:
   a plurality of holsters for receiving said plurality of jumper clamps.

17. The portable jump starter as recited in claim 16 wherein said portable jump starter comprises a front panel, a rear panel, a first side panel and a second side panel, said plurality of holsters comprising a first holster and a second holster integrally molded in said first side panel and said second side panel, respectively.

18. The portable jump starter as recited in claim 17 wherein each of said plurality of jumper clamps comprises a grip, each of said plurality of holsters comprising at least one rib for engaging said grip in order to secure said plurality of jumper clamps in a locked position when they are received in said plurality of holsters, respectively.

19. The portable jump starter as recited in calm 17 wherein said portable jump starter comprises a base for supporting said portable jump starter, said plurality of holsters each defining an opening directed away from said base.

20. The portable jump starter as recited in claim 13 wherein said portable jump starter further comprises:
   at least one adjustable illuminator; and
   a switch for coupling said at least one adjustable illuminator to said battery in order to energize said at least one adjustable illuminator.

21. The portable jump starter as recited in claim 13 wherein said portable jump starter comprises a front panel, a rear panel, a first side panel and a second side panel, said at least one adjustable illuminator being located in said front panel.

22. The portable jump starter as recited in claim 20 wherein said at least one adjustable illuminator is pivotally adjustable in a plurality of planes.

23. The portable jump starter as recited in claim 20 wherein said at least one adjustable illuminator is pivotally adjustable in a vertical plane.

24. The portable jump starter as recited in claim 13 wherein said portable jump starter further comprises:
   a notifier for notifying persons of location, position, or emergency information.

25. The portable lump starter as recited in claim 24 wherein said portable jump starter comprises a front panel, a rear panel, a first side panel and a second side panel, said notifier comprising a reflective label situated on at least one of said front panel, rear panel, first side panel or second side panel.

26. The portable jump starter as recited in claim 25 wherein said reflective label is situated on said front panel.

27. The portable jump starter as recited in claim 24 wherein notifier comprises an internal light situated in said housing for illuminating said housing.

28. The portable jump starter as recited in claim 24 wherein said housing is molded a predetermined color to provide said notifier.

29. The portable jump starter as recited in claim 28 wherein said predetermined color is orange, red, yellow, green or camouflage.

30. The portable jump starter as recited in claim 24 wherein said notifier comprises a global positioning system for identifying a position of said portable jump starter.

31. The portable jump starter as recited in claim 24 wherein said notifier comprises a cellular phone.

32. The portable jump starter as recited in claim 24 wherein said notifier comprises a radio.

33. The portable jump starter as recited in claim 24 wherein said notifier comprises an external flashing light for illuminating said housing.

34. The portable jump starter as recited in claim 33 wherein said external flashing light is red, orange or yellow.

35. The portable jump starter as recited in claim 33 wherein said external flashing light is integrally molded into said housing.

36. The portable jump starter as recited in claim 33 wherein said external flashing light is a rotating light mounted on said housing.

37. A portable safety system comprising:
   a housing for receiving a battery;
   a jumper for coupling to said battery, said jumper having a pair of clamps for coupling said battery to a power-consumer;
   at least one holster for receiving said pair of jumper clamps while said pair of jumper clamps are in a closed position; and
   a notifier for notifying persons of location, position, or emergency information.

38. The portable jump starter as recited in claim 37 wherein said portable jump starter comprises a front panel, a rear panel, a first side panel and a second side panel, said notifier comprising a reflective label situated on at least one of said front panel, rear panel, first side panel or second side panel.

39. The portable jump starter as recited in claim 38 wherein said reflective label is situated on said front panel.

40. The portable jump starter as recited in claim 38 wherein notifier comprises an internal light situated in said housing for illuminating said housing.

41. The portable jump starter as recited in claim 37 wherein said housing is molded a predetermined color to provide said notifier.

42. The portable jump starter as recited in claim 40 wherein said predetermined color is orange, red, yellow, green or camouflage.

43. The portable jump starter as recited in claim 38 wherein said notifier comprises a global positioning system for identifying a position of said portable jump starter.

44. The portable jump starter as recited in claim 38 wherein said notifier comprises a cellular phone.

45. The portable jump starter as recited in claim 37 wherein said notifier comprises a radio.

46. The portable jump starter as recited in claim 37 wherein said notifier comprises an external flashing light for illuminating said housing.

47. The portable jump starter as recited in claim 46 wherein said external flashing light is red or yellow.

48. The portable jump starter as recited in claim 46 wherein said external flashing light is integrally molded into said housing.

49. The portable jump starter as recited in claim 46 wherein said external flashing light is a rotating light mounted on said housing.

50. The portable jump starter as recited in claim 37 wherein said at least one holster is integrally molded in said housing, said holster defining a receiving area for receiving said plurality of jumper clamps while said plurality of jumper clamps are in said closed position.

51. The portable jump starter as recited in claim 37 wherein said at least one holster comprises at least one receiving area for receiving a detent on at least one of said plurality of jumper clamps in order to retain said clamp in a locked position when it is received in said at least one holster.

52. The portable jump starter as recited in claim 37 wherein said portable jump starter comprises:
 a plurality of holsters for receiving said plurality of jumper clamps.

53. The portable jump starter as recited in claim 52 wherein said portable jump starter comprises a front panel, a rear panel, a first side panel and a second side panel, said plurality of holsters comprising a first holster and a second holster integrally molded in said first side panel and said second side panel, respectively.

54. The portable jump starter as recited in claim 52 wherein each of said plurality of jumper clamps comprises a grip, each of said plurality of holsters comprising at least one rib for engaging said grip in order to secure said plurality of jumper clamps in a locked position when they are received in said plurality of holsters, respectively.

55. The portable jump starter as recited in claim 52 wherein said portable jump starter comprises a base for supporting said portable jump starter, said plurality of holsters each defining an opening directed away from said base.

56. The portable jump starter as recited in claim 37 wherein said jumper comprises a single cable, said housing comprises a channel for receiving said single cable when said plurality of jumper clamps are stored in said at least one holster.

57. The portable jump starter as recited in claim 37 wherein said jumper comprises a plurality of cables, said housing comprises a plurality of channels for receiving said plurality of cables when said plurality of jumper clamps are received in said plurality of holsters.

58. The portable jump starter as recited in claim 57 and further comprising:
 at least one adjustable illuminator; and
 a switch for coupling said at least one adjustable illuminator to said battery in order to energize said at least one adjustable illuminator.

59. The portable jump starter as recited in claim 57 wherein said portable jump starter comprises a front panel, a rear panel, a first side panel and a second side panel, said at least one adjustable illuminator being located in said front panel.

60. The portable jump starter as recited in claim 58 wherein said at least one adjustable illuminator is pivotally adjustable in a plurality of planes.

61. The portable jump starter as recited in claim 58 wherein said at least one adjustable illuminator is pivotally adjustable in one plane.

62. The portable jump starter as recited in claim 60 wherein said one plane comprises a vertical plane.

63. The portable jump starter as recited in claim 37 wherein said portable jump starter comprises a front panel, a rear panel, a first side panel and a second side panel, said notifier comprising a reflective label situated on at least one of said front panel, rear panel, first side panel or second side panel.

64. The portable jump starter as recited in claim 63 wherein said reflective label is situated on said front panel.

65. The portable jump starter as recited in claim 63 wherein notifier comprises an internal light situated in said housing for illuminating said housing.

66. The portable jump starter as recited in claim 37 wherein said housing is molded a predetermined color to provide said notifier.

67. The portable jump starter as recited in claim 66 wherein said predetermined color is orange, red, yellow, green or camouflage.

68. The portable jump starter as recited in claim 37 wherein said notifier comprises a global positioning system for identifying a position of said portable jump starter.

69. The portable jump starter as recited in claim 37 wherein said notifier comprises a cellular phone.

70. The portable jump starter as recited in claim 37 wherein said notifier comprises a radio.

71. The portable jump starter as recited in claim 37 wherein said notifier comprises an external flashing light for illuminating said housing.

72. The portable jump starter as recited in claim 71 wherein said external flashing light is red or yellow.

73. The portable jump starter as recited in claim 71 wherein said external flashing light is integrally molded into said housing.

74. The portable jump starter as recited in claim 71 wherein said external flashing light is a rotating light mounted on said housing.

75. A portable jump starter comprising:
 a housing for receiving a battery;
 a jumper for coupling said battery to a power-consuming device; said jumper comprising a plurality of jumper clamps, with each of said plurality of jumper clamps being movable from a closed position to an open position;
 at least one holster for receiving said plurality of jumper clamps while said plurality of jumper clamps are in said closed position;
 at least one adjustable illuminator;
 a switch for coupling said at least one adjustable illuminator to said battery in order to energize said at least one adjustable illuminator; and
 a notifier for notifying persons of location, position, or emergency information.

76. The portable jump starter as recited in claim 75 wherein said notifier comprises a reflective label.

77. The portable jump starter as recited in claim 76 wherein said reflective label is situated on a front panel of said housing.

78. The portable jump starter as recited in claim 75 wherein notifier comprises an internal light situated in said housing for illuminating said housing.

79. The portable jump starter as recited in claim 75 wherein said housing is molded a predetermined color to provide said notifier.

80. The portable jump starter as recited in claim 79 wherein said predetermined color is orange, red, yellow, green or camouflage.

81. The portable jump starter as recited in claim 75 wherein said notifier comprises a global positioning system for identifying a position of said portable jump starter.

82. The portable jump starter as recited in claim 75 wherein said notifier comprises a cellular phone.

83. The portable jump starter as recited in claim 75 wherein said notifier comprises a radio.

84. The portable jump starter as recited in claim 75 wherein said notifier comprises an external flashing light for illuminating said housing.

85. The portable jump starter as recited in claim 84 wherein said external flashing light is red or yellow.

86. The portable jump starter as recited in claim 84 wherein said external flashing light is integrally molded into said housing.

87. The portable jump starter as recited in claim 84 wherein said external flashing light is a rotating light mounted on said housing.

88. A portable jump starter comprising:
a housing for receiving a battery;
an inverter for converting a DC power to an AC power;
an AC power outlet;
a DC power connection for coupling said battery to either a power source in order to recharge the battery or a DC power consumer;
a jumper for coupling said battery to a power-consuming device; said jumper comprising a plurality of jumper clamps, with each of said plurality of jumper clamps being movable from a closed position to an open position;
at least one holster for receiving said plurality of jumper clamps while said plurality of jumper clamps are in said closed position;
at least one adjustable illuminator;
a switch for coupling said at least one adjustable illuminator to said battery in order to energize said at least one adjustable illuminator; and
a notifier for notifying persons of location, position, or emergency information.

89. The portable jump starter as recited in claim 88 wherein said notifier comprises a reflective label.

90. The portable jump starter as recited in claim 89 wherein said reflective label is situated on a front panel of said housing.

91. The portable jump starter as recited in claim 88 wherein notifier comprises an internal light situated in said housing for illuminating said housing.

92. The portable jump starter as recited in claim 88 wherein said housing is molded a predetermined color to provide said notifier.

93. The portable jump starter as recited in claim 92 wherein said predetermined color is orange, red, yellow, green or camouflage.

94. The portable jump starter as recited in claim 88 wherein said notifier comprises a global positioning system for identifying a position of said portable jump starter.

95. The portable jump starter as recited in claim 88 wherein said notifier comprises a cellular phone.

96. The portable jump starter as recited in claim 88 wherein said notifier comprises a radio.

97. The portable jump starter as recited in claim 88 wherein said notifier comprises an external flashing light for illuminating said housing.

98. The portable jump starter as recited in claim 97 wherein said external flashing light is red or yellow.

99. The portable jump starter as recited in claim 97 wherein said external flashing light is integrally molded into said housing.

100. The portable jump starter as recited in claim 97 wherein said external flashing light is a rotating light mounted on said housing.

101. The portable jump starter as recited in claim 88 further comprising a gauge for indicating a voltage level of said battery.

102. A method for providing for providing a multipurpose power supply comprising the steps of:
providing a portable jump starter comprising:
a housing for receiving a battery; said housing having a base;
a jumper for coupling said battery to a power-consuming device; said jumper comprising a plurality of jumper clamps, with each of said plurality of jumper clamps being movable from a closed position to an open position;
at least one holster for receiving said plurality of jumper clamps while said plurality of jumper clamps are in said closed position; and
enabling said plurality of jumper clamps to be removed from said at least one holster away from said base without substantially compressing said plurality of jumper clamps.

103. The method as recited in claim 102 wherein said method further comprises the step of: providing said housing with a plurality of holsters for receiving said plurality of jumper clamps.

104. The method as recited in claim 103 wherein said method further comprises the step of:
providing said housing comprising said plurality of holsters comprising a first holster and a second holster integrally molded in said first side panel and said second side panel, respectively.

105. The method as recited in claim 104 wherein each of said plurality of jumper clamps comprises a grip, each of said plurality of holsters comprising at least one rib for engaging said grip in order to secure said plurality of jumper clamps in a locked position when they are received in said plurality of holsters, respectively.

106. The portable jump starter as recited in claim 103 further comprising a portable jump starter defining said plurality of holsters to each define an opening directed away from said base.

107. The method as recited in claim 103 wherein said method further comprises the step of:
providing a reflective label on said housing.

108. The method as recited in claim 103 wherein said method further comprises the step of:
providing an internal illuminator situated in said housing for illuminating said housing.

109. The portable jump starter as recited in claim 108 wherein said housing is molded a predetermined color.

110. The portable jump starter as recited in claim 109 wherein said predetermined color is orange, red, yellow, green or camouflage.

111. The portable jump starter as recited in claim 102 wherein said method comprises the step of:
providing a receiving area for receiving a portable cellular phone, GPS, walkie-talkie or radio.

* * * * *